United States Patent
Arutla et al.

(10) Patent No.: US 8,046,477 B1
(45) Date of Patent: Oct. 25, 2011

(54) CONFIGURATION VALIDATION AND AMBIGUOUS MAPPING

(75) Inventors: Keerthi K. Arutla, Fremont, CA (US);
John D. Panelli, Campbell, CA (US);
Bindu Nimmagadda, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 1291 days.

(21) Appl. No.: 11/640,600

(22) Filed: Dec. 18, 2006

(51) Int. Cl.
*G06F 15/16* (2006.01)
*G06F 15/173* (2006.01)
*G06F 15/177* (2006.01)

(52) U.S. Cl. ......... 709/229; 709/220; 709/221; 709/223
(58) Field of Classification Search .................. 709/206, 709/230, 246, 223, 220, 221, 228, 229
See application file for complete search history.

(56) References Cited

U.S. PATENT DOCUMENTS

| | | | | |
|---|---|---|---|---|
| 6,347,303 B2* | 2/2002 | Nagai et al. | ......................... | 705/7 |
| 7,328,260 B1* | 2/2008 | Muthiyan et al. | ............. | 709/224 |
| 7,496,551 B1* | 2/2009 | Jalagam et al. | ................. | 706/47 |
| 7,512,595 B1* | 3/2009 | McBride et al. | ....................... | 1/1 |
| 7,577,724 B1* | 8/2009 | Jalagam et al. | ............. | 709/220 |
| 7,685,261 B1* | 3/2010 | Marinelli et al. | ............. | 709/220 |
| 2004/0034577 A1* | 2/2004 | Van Hoose et al. | ............. | 705/28 |
| 2006/0085532 A1* | 4/2006 | Chu et al. | ...................... | 709/223 |

* cited by examiner

*Primary Examiner* — Kristie Shingles
(74) *Attorney, Agent, or Firm* — Krishnendu Gupta; Gerald P. Kazanjian

(57) ABSTRACT

A rule engine applies storage area network configuration validation rules to verify whether a proposed storage area network configuration includes compatible resources for use in a storage area network environment. The storage area network configuration validation rules enable a proposed combination of storage area network resources to be validated against compatibility data in a repository even when one or more of the resources in the proposed combination ambiguously maps to multiple possible resources and each of other resources in the proposed combination specifically maps to a single respective known component type. Accordingly, an advisory system herein can provide notification whether a proposed or existing storage area network configuration is qualified for use even though one or more of the resources in the combination is ambiguously mapped to multiple possible storage area network resource types.

20 Claims, 11 Drawing Sheets

| Rule ID | Category | Rule Name | | | Objects | Severity |
|---|---|---|---|---|---|---|
| 5701 | EMC Support Matrix | Base Connectivity interoperability with one ambiguous component | | | Host, HBA, Array | Warning |
| Description | | Reports the specific values that an ambiguous component must be in order for the Host, OS, HBA, and Array to be interoperable. | | | | |
| Single Message Text | | According to the EMC Support Matrix 'Base Connectivity' section, host configuration ${ServerModel} -- ${OSModelVersion} -- ${HBAModelVersion} -- ${ArrayModel} for ${SiteSlash}${ServerName} is qualified only if ${AmbiguousCompType}${AmbiguousCompModel} is one of the following ${QualifiedModels}. For a list of all qualified configurations ${ClickHere}. | | | | |
| Combine Message Text | | According to the EMC Support Matrix 'Base Connectivity' section, following host configurations are qualified only if ambiguous component is one of the listed models. | | | | |
| | | Site | Host | Configuration | Ambiguous Component | Qualified Models | All Qualified Configurations |
| | | ${Site} | ${ServerName} | ${ServerModel} -- ${OSModelVersion} -- ${HBAModelVersion} -- ${ArrayModel} | ${AmbiguousCompType}${AmbiguousCompModel} | ${QualifiedModels} | ${ClickHere} |
| Conditions | | 1. None of the components are marked as obsolete or as 'Not in ESM'.<br>2. Only one component from Host, OS, HBA, and Array is type-in.<br>3. Some ESM configurations exist for the non type-in components combinations.<br>4. If type-in component can be resolved/mapped to multiple components then only some of those components are qualified. (If all components are qualified then entire configuration is valid. If none of mapped components are qualified then entire configuration is not valid.) | | | | |
| Appear in pages | | Config.*.${CompId},config.overview | | | | |

*Note: The "Combine Message Text" row contains an embedded sub-table with columns: Site, Host, Configuration, Ambiguous Component, Qualified Models, All Qualified Configurations.*

FIG. 3

| Rule ID | Category | Rule Name | | | Objects | Severity |
|---|---|---|---|---|---|---|
| 5702 | EMC Support Matrix | Base Connectivity interoperability with two ambiguous components | | | Host, HBA, Array | Warning |
| Description | | Reports the specific combinations of ambiguous components in order for the Host, OS, HBA, and Array to be interoperable. | | | | |
| Single Message Text | | According to the EMC Support Matrix 'Base Connectivity' section, host configuration ${ServerModel} -- ${OSModelVersion} -- ${HBAModelVersion} -- ${ArrayModel} for ${SiteSlash}${ServerName} is qualified only for certain configurations of ${AmbiguousCompType1} and ${ AmbiguousCompType2}. ${ClickHere} to see all qualified configurations. | | | | |
| Combine Message Text | | According to the EMC Support Matrix 'Base Connectivity' section, following host configurations are qualified only for certain combinations of ambiguous components. | | | | |
| | | Site | Host | Configuration | Ambiguous Components | Qualified Configurations |
| | | ${Site} | ${ServerName} | ${ServerModel} -- ${OSModelVersion} -- ${HBAModelVersion} -- ${ArrayModel} | ${AmbiguousCompType1}, ${AmbiguousCompType2} | ${ClickHere} |
| Conditions | | 1. None of the components are marked as obsolete or as 'Not in ESM'.<br>2. Only two components from Host, OS, HBA, and Array is type-ins.<br>3. At least one type-in component is resolved/mapped to multiple components.<br>4. If both type-in components can be resolved/mapped to multiple components then only some combinations of resolved components are qualified. (If all components are qualified then entire configuration is valid. If none of the combinations are qualified then entire configuration is not valid.) | | | | |

FIG. 4

Qualified Configurations

Qualified Configurations for Base Connectivity

| No. | Host System | Operating System | Host Bus | Host Bus Adapter | Driver | Firmware Revision | Topology | Storage Array | External Boot | Comments | SNIA HBA API Supported |
|---|---|---|---|---|---|---|---|---|---|---|---|
| 1 | Dell PowerEdge 2450[4] | Microsoft Windows 2000 Advanced Server SP4 | PCI | Emulex LP 7000E-EMC[10,12] | 2.23a6[7] | 3.30a7 | FC-AL, FC-SW | EMC Symmetrix 8000 Series | Y[2,3] | See[1] | Yes |
| 2 | Dell PowerEdge 2450[4] | Microsoft Windows 2000 Advanced Server SP4 | PCI | Emulex LP-002DC-E[7,8,12,13] | 2.40a2[8,7] | 3.92a2 | FC-AL, FC-SW | EMC Symmetrix 8000 Series | Y[2,3] | See[1] | Yes |
| 3 | Dell PowerEdge 2450[4] | Microsoft Windows 2000 Advanced Server SP4 | PCI | Emulex LP10000-E[8,10], LP10000CD-E[8,10], LP1050-E[8,14], LP1050CD-E[8,14] | 2.30a2[8,7], 2.40a2[8,7] | 1.91a1 | FC-AL, FC-SW | EMC Symmetrix 8000 Series | Y[2,3] | See[1] | |
| 4 | Dell PowerEdge 2450[4] | Microsoft Windows 2000 Advanced Server SP4 | PCI | Emulex LP11002-E, LP1150-E | 2.40a2[8,7] | 2.10a7[1] | FC-AL, FC-SW | EMC Symmetrix 8000 Series | Y[2,3] | See[1] | Yes |
| 5 | Dell PowerEdge 2450[4] | Microsoft Windows 2000 Advanced Server SP4 | PCI | Emulex LP8000-EMC[8,9], LP850-EMC[8,10], LP9002-E (LP9002L-E)[8] | 2.30a2[8,7], 2.40a2[8,7] | 3.92a2 | FC-AL, FC-SW | EMC Symmetrix 8000 Series | Y[2,3] | See[1] | |
| 6 | Dell PowerEdge 2450[4] | Microsoft Windows 2000 Advanced Server SP4 | PCI | Emulex LP9802-E[8,11,13], LP9802CD-E[8,11], LP982-E[8,11,13] | 2.30a2[8,7], 2.40a2[8,7] | 1.91a1 | FC-AL, FC-SW | EMC Symmetrix 8000 Series | Y[2,3] | See[1] | Yes |

| 5700 | EMC Support Matrix | Component not in the ESM | | Switch, HBA, Host, Array, Tape Device, Bridge, Distance Device, Tape Library Fabric | |
|---|---|---|---|---|---|
| Description | Reports components that are not qualified because they are not in the ESM. | | | | |
| Single Message Text | ${SiteSlash}${CompName} is not qualified against the EMC Support Matrix '${ESMSection}' section because ${NotInESMComponent} is not in the ESM. | | | | |
| Combine Message Text | The following components are not qualified against the EMC Support Matrix because they contain one or more components that are not in ESM. | | | | |
| | Site | Location | Components not in ESM | ESM Sections Checked | |
| | ${Site} | ${CompName} | ${NotInESMComponent} | ${ESMSection} | |
| Conditions | 1. Applies to component types that are in ESM.<br>2. Component is type-in and is flagged as 'Not in ESM' or component is in ESM and is marked as obsolete (life cycle sid=432). | | | | |

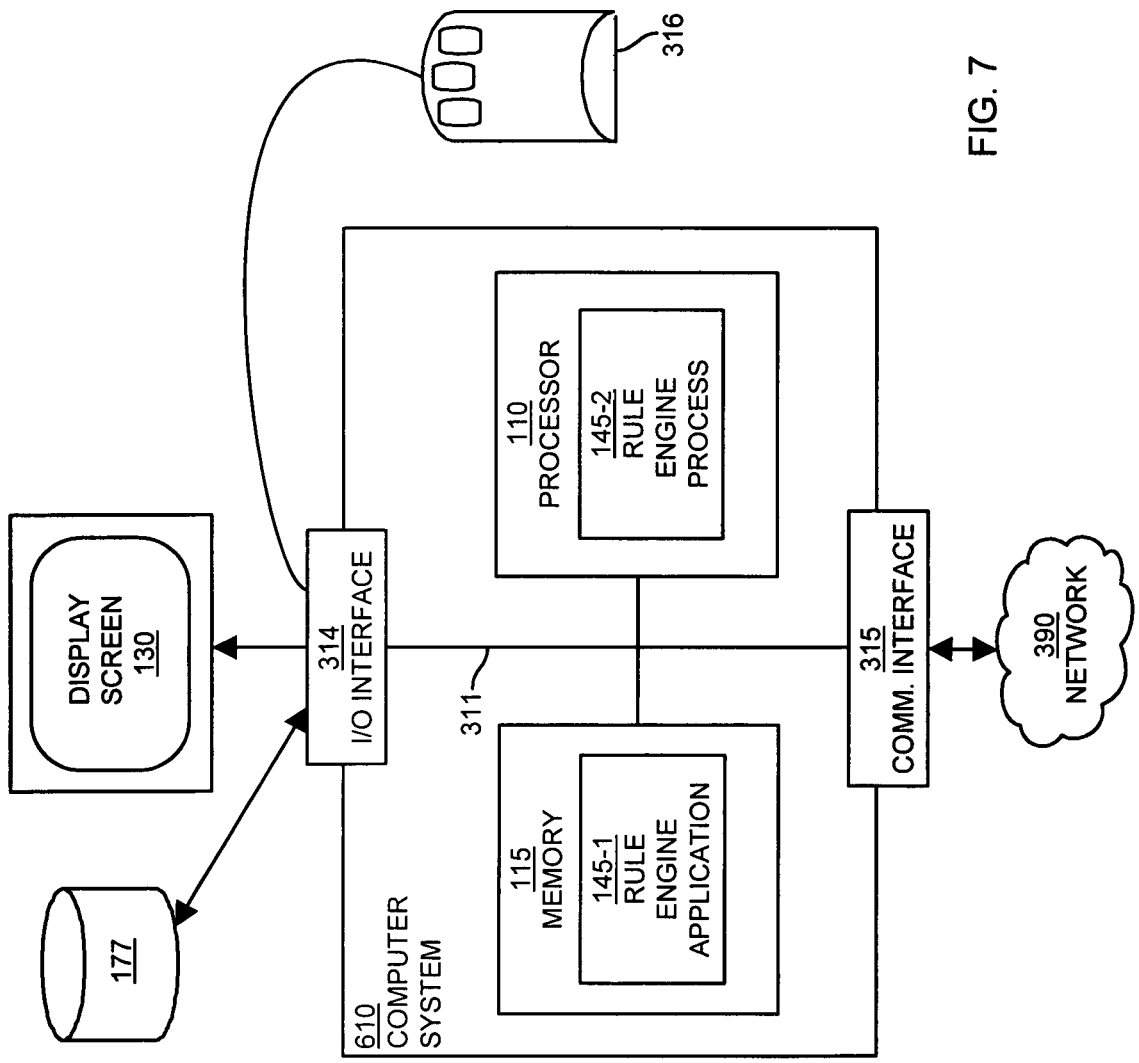

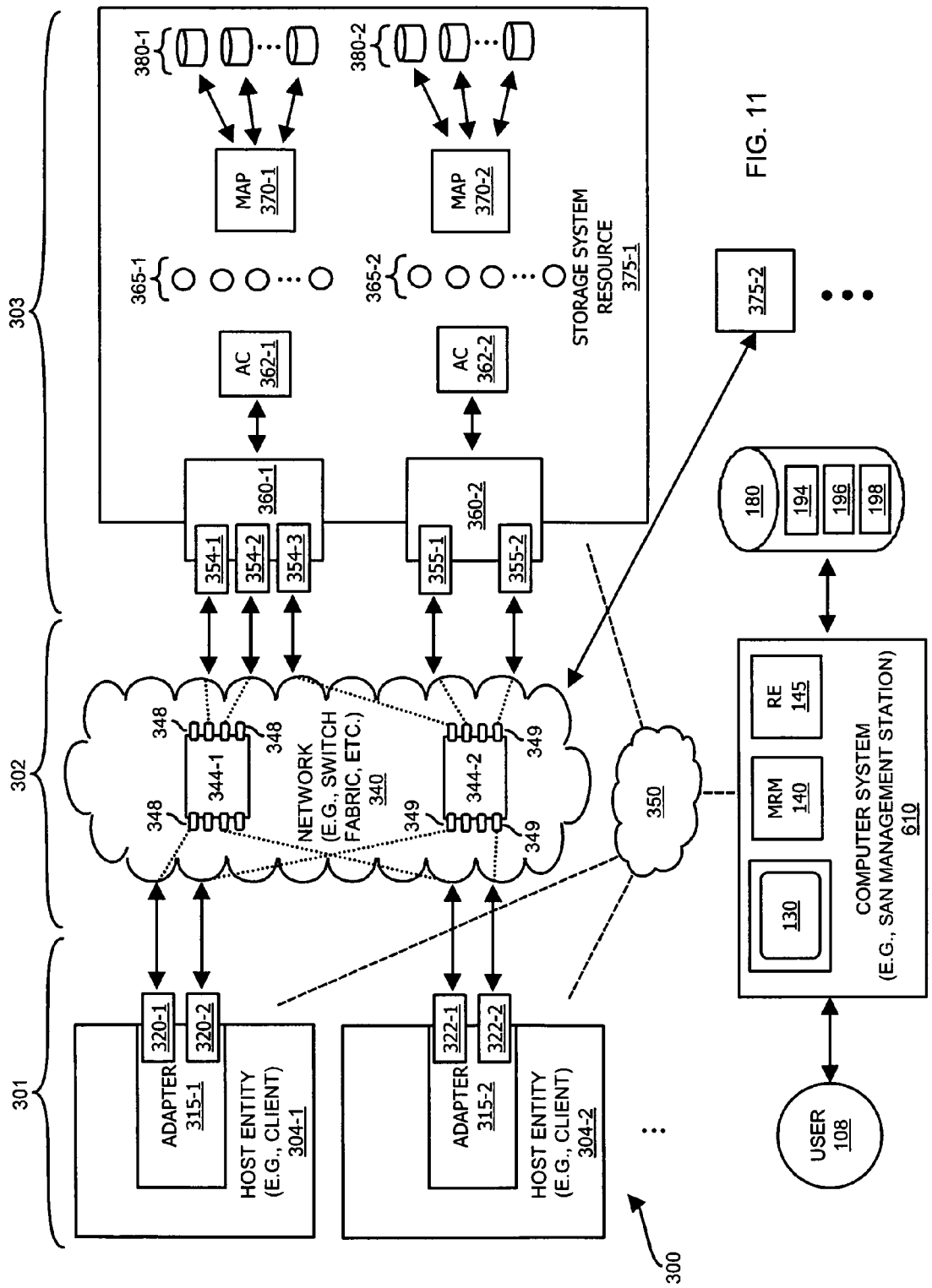

CONFIGURATION VALIDATION AND AMBIGUOUS MAPPING

RELATED APPLICATIONS

This application is related to U.S. Pat. No. 7,673,031 to Jalagarn et al., entitled "RESOURCE MAPPING IN A NETWORK ENVIRONMENT," the entire teachings of which are incorporated herein by this reference.

BACKGROUND

In general, a so-called storage area network (SAN) is a collection of data storage systems that are networked via a switching fabric to a number of host computer systems operating as servers. The host computers (also known as servers) of a respective storage area network access data stored in respective data storage systems on behalf of client computers that request data. For example, according to conventional techniques, upon receiving a storage access request, a respective host computer in a storage area network accesses a large repository of storage through a switching fabric on behalf of a corresponding requesting client. An access can include a read or write of data to storage.

Typically, many clients can access data through the same host computer or server. Thus, storage area networks enable multiple clients to access one or more shared storage systems through the same host computer. In many applications, storage area networks support hi-speed acquisitions of data so that the host servers are able to promptly retrieve and store data from the data storage system.

A respective infrastructure supporting access to data in a storage area network can be quite complex. For example, as discussed above, consider the number of hardware and software components that must work in harmony in order for a user to successfully access data stored in a storage array of a SAN. To access such data, a user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system transmits the I/O requests through a host interface device resource, such as a host bus adapter interface card (e.g., SCSI or FibreChannel adapter) having one or more I/O port resources, across an interface cable or networking medium of one or more SAN switches (e.g., in a storage area network implementation) to a front-end adapter interface card resource operating on a high-capacity data storage disk array of the SAN. The front-end adapter interface card receives the I/O requests and interprets them to identify appropriate data locations within specific storage device resources contained in the storage array.

After the requested data is accessed from the storage devices, respective I/O responses are typically returned from the accessed storage system to the application along an information or data flow path (based on operations and processing functionality provided by each of the aforementioned components and resources) in a reverse direction back to the application on the host computer running. In this way, access to data in a conventional storage area network involves reliance on a proper operation and coordination of a multitude of software and hardware resources in a storage area network to retrieve data from storage and serve the data to a client.

If even a single resource such as a switch, operating system, host bus adapter, storage system, etc. in a respective storage area network is incompatible with other hardware and/or software resources present in the storage area network, then the storage area network may no longer operate properly and enable a respective user to retrieve stored data.

One conventional way to ensure that a storage area network will work properly (e.g., so that the storage area network enables users to access corresponding stored data) is to apply a set of interoperability rules to verify whether a respective storage area network is configured properly. In general, the set of interoperability rules can indicate which combination of different types of hardware and software resources are compatible (or not) with each other and can (or cannot) be used together in a respective storage area network. When rules are applied to a respective storage area network configuration, an administrator can identify incompatibilities in the configuration that might cause operational problems in the SAN.

SUMMARY

Conventional applications that support management and identification of configuration problems within storage area network environments can suffer from a number of deficiencies. For example, as discussed above, management of a storage area network can be a challenge due to the complex network of resources that must be combined so that the storage area network operates properly for a multitude of different types of users. Manual verification of a respective SAN configuration by an administrator can be time-consuming as well as require paying close attention to details. In certain cases, if a respective administrator fails to properly identify that a set of one or more storage area network resources are incompatible with each other, one or more client applications in communication with a respective server may not be able to access data in the storage area network. Also, conventional rule engines that operate to validate SAN configurations are typically complex and cumbersome to maintain and use since conventional validation technique requiring a mapping of all SAN resources to a specific identity of a vendor product. Thus, for a conventional rule engine that operates to validate a SAN configuration, each resource in that configuration must be specifically mapped to a single specific vendor and product identity prior to the validation process occurring. If the specific product identity of a resource is unable to be identified, validation or incompatibility testing cannot occur properly.

Techniques discussed herein deviate with respect to conventional applications such as those discussed above as well as other techniques known in the prior art. For example, embodiments herein include a rule engine process that applies storage area network configuration validation rules. The storage area network configuration validation rules enable a proposed combination of storage area network resources to be validated against compatibility data in a repository, even when not every resource in the proposed combination of resources is specifically mapped to a single respective known component type or specific vendor product identity. In other words, an advisory system herein can provide notification whether a proposed or existing storage area network configuration is qualified for use even though one or more of the resources in the combination is ambiguously mapped to multiple possible storage area network resource types.

For example, in one embodiment, a storage area network advisory system maintains a repository of compatibility information derived from interoperability testing of combinations of different types of resources in a storage area network environment. The compatibility information indicates which specific types of storage area network resources work properly and can be used in a respective storage area network environment.

In addition to maintaining compatibility information, the storage area network advisory system maintains a repository of message rules for selectively providing advisory messages associated with different proposed (e.g., not yet implemented or currently implemented) storage area network configurations. Each of the multiple message rules can specify a format for displaying advisories indicating whether a respective storage area network resource in a configuration maps to multiple different possible types of qualified resources.

The storage area network advisory system can receive either raw or refined configuration information associated with a combination of storage area network resources. As an example, in one embodiment, raw information can be collected from storage area network resources in a respective storage area network environment. This raw information may be extracted, for example, from a SAN configuration database collected and maintained by a SAN management software application. The storage area network advisory system maps (or attempts to map using best efforts) the storage area network resources identified in this raw information to one or more possible specific identities that are known (e.g., qualified) to work or not work in a storage area network when used in combination with other resources.

Certain resources in a proposed storage area network configuration each can map directly to a corresponding single one of multiple qualified resource types. As mentioned above, other resources in the proposed storage area network configuration can (provisionally) map to multiple different resource types. This latter case (e.g., mapping of a resource to multiple different types) occurs when a mapping function associated with the storage area network advisory system is uncertain of a resource type to assign to a resource present in the proposed storage area network configuration. By mapping a resource to one or more resource types, what is meant, for example, is identifying, for a given resource defined by raw configuration information in a SAN configuration obtained from a SAN management application, a specific identity of a vendor and product made by that vendor that corresponds to that resource. As a specific example, a proposed network configuration might contain data collected from a host computer system. This data represents the host, but it may be difficult to identify a specific vendor or manufacturer of the host and it may also be difficult to identity what operating system and version is executing on the host, what patch levels are installed on the operating system and so forth. This is because the data collected from the SAN management application for that host resource may be somewhat cryptic in nature.

In a circumstance in which each resource in the storage area network configuration maps to a corresponding single known and tested resource type, the storage area network advisory system can access stored compatibility information in the above-mentioned repository, perform a comparison, and verify whether the proposed storage area network configuration will work properly or not. Based on the comparison, if a combination of resource types in the proposed storage area network configuration is incompatible, the proposed storage area network configuration will not work properly. Conversely, if a combination of resource types in the proposed storage area network configuration is compatible based on the comparison, the proposed storage area network configuration should theoretically work properly.

In one embodiment, in response to identifying that a given one or more resources in a proposed storage area network configuration maps to multiple different possible types of resources, the storage area network advisory system initiates validation of the combination of storage area network resources with respect to known acceptable configurations even though one or more storage area network resources maps to multiple different possible types of resources (e.g. the data for a host resource identifies an operating system such as Microsoft Windows, but is unable to identify which specific version of Windows operates on that host—thus that resource maps to "all" or any versions of Windows). Is such cases, the storage area network advisory system compares different possible permutations associated with a proposed storage area network configuration (e.g. each possible version of Windows) with the acceptable configurations specified by the compatibility information stored in the repository to identify any possible incompatibilities. In general, the comparison produces an output of whether a configuration is acceptable.

The storage area network advisory system can include a rule engine that applies one or more corresponding message rendering rules for providing notification (e.g., to a storage area network administrator) whether a proposed combination of storage area network resources includes any ambiguously mapped (e.g., multi-mapped) storage area network resources. The notification can be included in a report indicating which of the multiple different possible types of resources that an "unmapped" or "multi-mapped" resource must be in order for the combination of resources to form an acceptable configuration for use in a storage area network environment.

As an example, suppose that a proposed storage area network configuration includes a host computer, an operating system, a host bus adapter, and a storage array. Assume that the host computer maps to a known resource of type A, the operating system maps to multiple possible (e.g., is multi-mapped to) resource types such as types D, E, or F, the host bus adapter maps to resource type B, and the storage array maps to resource type C. Given the uncertainty associated with the operating system type and certainty associated with the other resources, there are multiple possible permutations for validation. For example, the storage area network configuration could be:

(host=A, operating system=D, host bus adapter=B, storage array=C)

(host=A, operating system=E, host bus adapter=B, storage array=C)

(host=A, operating system=F, host bus adapter=B, storage array=C)

Assume that the operating system resource as discussed above maps only to one known type of resource such as one of operating system resource type D, E, or F. However, even though it is uncertain to which of the multiple different resource types the operating system maps, the storage area network advisory system checks each of the permutations and verifies whether any or all of the different combinations are acceptable or compatible (or not) for use in a storage area network environment.

In general, there are three possible outcomes: all permutations of the above resources are acceptable, some of the permutations of the above resources are acceptable, or none of the permutations of the above resources are acceptable. The storage area network advisory system can provide notification of any of these outcomes based on application of the different message rules. If all or none of the permutations are acceptable storage area network configurations, the network administrator need not delve more deeply into a process of determining which of the three types of resources the operating system actually maps since, in either of these cases, the proposed storage area network configuration is definitively acceptable or not acceptable even though there happens to be ambiguity with respect to the actual type associated with the operating system.

When only some (e.g., one or more) of the possible permutations are acceptable, the storage area network advisory system can provide a different type of notification to a respective network administrator. For example, the storage area network advisory system can provide notification of which resource type the operating system must be in order for the proposed storage area network configuration to be valid. Suppose in the present example that the storage area network advisory system learns (via the comparison with the compatibility information) that only resource type D and E (operating system) can be used as a qualified combination with resource types A (host), B (host bus adapter), and C (storage array). In the context of the present example, the storage area network advisory system notifies (e.g., provides a warning message to) the network administrator that the proposed combination (including the multi-mapped operating system component) is acceptable as long as the operating system is of the type D or E.

In one embodiment, the network administrator can request that the storage area network advisory system produce a listing (e.g., of rows and columns of information) of which combinations of resource types are acceptable. In the above example illustrating a single multi-mapped resource, in response to such a request, the storage area network advisory system would display a table including the acceptable configuration such as:

| HOST | OPERATING SYSTEM | HOST BUS ADAPTER | STORAGE ARRAY |
|------|------------------|------------------|---------------|
| A    | D                | B                | C             |
| A    | E                | B                | C             |

Accordingly, embodiments herein include providing one or more advisories indicating which, if any, permutations of the combination are valid for use in a storage area network environment. Additionally, embodiments herein include identifying that a given (multi-mapped) storage area network resource in a combination of storage area network resources is potentially one of a first type of resource or a second type of resource; verifying whether the combination including the given (multi-mapped) storage area network resource and the resources in the combination other than the given storage area network resource are compatible for use in a respective storage area network environment. This latter step of verifying can include: i) validating whether a first possible configuration (in which the given resource is of the first type) represents an acceptable configuration of interoperable storage area network resources; and ii) validating whether a second possible configuration (in which the given resource is of the second type) represents an acceptable configuration of interoperable storage area network resources.

Note that a proposed combination may include multiple instances of multi-mapped resources. In such a case and in a similar vein as discussed above for the case illustrating identification of only a single ambiguous component, the storage area network advisory system according to embodiments herein can check the different possible permutations for multiple multi-mapped resources and provide an indication of which permutations produce acceptable combinations for use in a storage area network environment.

For example, suppose that a proposed configuration of resources includes a host computer that maps to a known resource of type A, an operating system that maps to multiple possible (e.g., is multi-mapped to) resource types such as types D, E, or F, a host bus adapter that multi-maps to resource type B of resource type G, and a storage array that maps to resource type C. In this example and in a similar vein as discussed above, the rule engine of storage area network advisory system can check the different permutations for a combination of the single mapped (e.g., the host computer system and storage array resources) and multiple-mapped resources (e.g., the operating system and the host bus adapter resources) and provide an indication of which permutations produce acceptable combinations for use in a storage area network environment.

In other words, in the context of this latter example in which the operating system multiple-maps to D, E, or F and the host bus adapter multi-maps to resource type B or G, the rule engine checks (e.g., validates) the different permutations including ADBC, AEBC, AFBC, as well as ADGC, AEGC, and AFGC against known valid configurations stored in a corresponding database and provides notification of whether any of these combinations are acceptable based on a comparison with respect to compatibility information.

In one embodiment, the user can request that the storage area network advisory system produce a listing (e.g., of rows and columns of information) of which combinations of resource types are acceptable. For example, upon displaying an error/warning message to a user via corresponding messages displayed on a display screen, a message rendering module according to embodiments herein can embed a selectable region in a displayed message (e.g., one of messages) enabling the user to view a table of different acceptable permutations.

Suppose that, after checking which or the permutations are valid based on verification with respect to valid configurations in a respective database, only the permutations of resources including ADBC and AEBC recite a compatible grouping of resources for use in storage area network. In such an instance, a display screen can include a display of valid resource combinations as follows:

| VALID RESOURCE COMBINATIONS ||||
|------|------------------|------------------|---------------|
| HOST | OPERATING SYSTEM | HOST BUS ADAPTER | STORAGE ARRAY |
| A    | D                | B                | C             |
| A    | E                | B                | C             |

Accordingly, embodiments herein include providing one or more advisories indicating which, if any, permutations of multiple multi-mapped resources are valid for use in a storage area network. In addition to the embodiments discussed above, other embodiments herein include a computerized device (e.g., a host computer, workstation, etc.) configured to support the techniques disclosed herein to manage resources and provide advisory information associated with a respective storage area network environment. In such embodiments, the computerized device includes a memory system, a processor (e.g., a processing device), a respective display screen to display messages, and an interconnect system connecting the processor and the memory system. The interconnect system can support communications with the respective display screen (e.g., display medium). The memory system is encoded with a rule engine or other storage area network configuration validation application that, when executed on the processor, generates a process for applying rules and initiating generation of advisories according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to maintain and apply rules to produce outputs such as advisory messages according to embodiments herein. For example, the computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for implementing the embodiments herein. For example, the instructions, when carried out by a processor of a respective computer device, cause the processor to perform the steps of: i) receiving configuration information associated with a combination of storage area network resources; ii) identifying that at least one storage area network resource of the storage area network resources maps to multiple different possible types of resources; and iii) initiating validation of the combination of storage area network resources with respect to known acceptable configurations even though the at least one storage area network resource maps to multiple different possible types of resources. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate in connection with the Control Center (ECC) software as well as other types of vendor software. Control Center software is manufactured by EMC Corporation of Hopkinton, Mass., USA.

As discussed above, techniques herein are well suited for use in applications such as management of resources in a respective storage area network environments. However, it should be noted that configurations herein are not limited to such use and thus configurations herein and deviations thereof are well suited for use in other types of environments as well. Note that each of the different features, techniques, configurations, etc. discussed at different locations in this specification can be executed independently or in combination. Accordingly, the present invention can be embodied and viewed in many different ways.

Also, note that this summary does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (combinations, permutations, etc.) of the invention, the reader is directed to the Detailed Description section and corresponding figures of the present disclosure.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

FIG. 3 is an example diagram of a message rule for generating messages based on one ambiguous storage area network component according to embodiments herein.

FIG. 4 is an example diagram of a message rule for generating messages based on two ambiguous storage area network component according to embodiments herein.

FIG. 5 is an example diagram illustrating different acceptable configurations according to embodiments herein.

FIG. 6 is an example diagram of a message rule for providing a report when one or more storage area network components are not qualified for use in a respective storage area network environment according to embodiments herein.

FIG. 7 is an example flowchart illustrating techniques associated with a rule engine process according to embodiments herein.

FIG. 11 is a block diagram more particularly illustrating an example of connectivity associated with different types of resources in a storage area network environment.

DETAILED DESCRIPTION

According to one embodiment, a storage area network advisory system includes a rule engine that applies one or more corresponding message rendering rules to provide notification (e.g., to a storage area network administrator) whether a proposed combination of storage area network resources includes any ambiguously mapped (e.g., multi-mapped) storage area network resources. In addition to providing notification of one or more ambiguous mappings (e.g., mapping of a storage area network resource to multiple possible resource types), the notification can include in a report identifying which of the multiple different possible types of resources that an "unmapped" or "multi-mapped" resource must be in order for the combination of resources to form an acceptable configuration for use in a storage area network environment.

Figure 1:
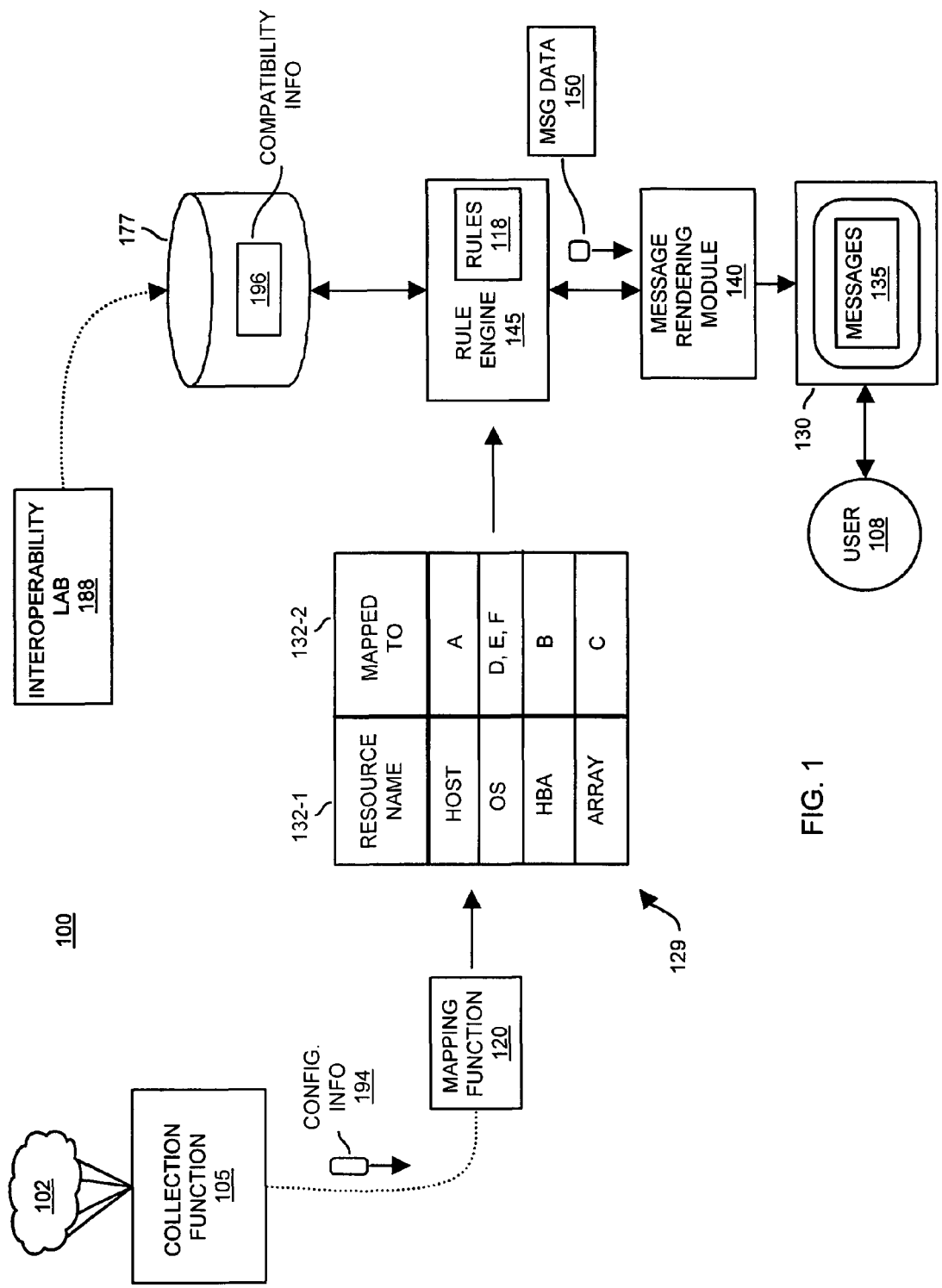
FIG. 1 is an example diagram illustrating a storage area network advisory system according to embodiments herein.

FIG. 1 is a diagram illustrating a storage area network advisory system 100 according to embodiments herein. As shown, storage area network advisory system 100 includes a storage area network 102, a collection function 105, a mapping function 120, mapped information 129, interoperability lab 188 (e.g., a test facility), repository 177 for storing compatibility information 196, rule engine 145, rules 118, message rendering module 140, display screen 130, and user 108. Note that although the following disclosure provides a detailed explanation with respect to use in a storage area network environment, techniques herein are well-suited for other applications as well.

In the context of the present example as shown in FIG. 1, storage area network advisory system 100 maintains a repository 177 of compatibility information 196 derived from interoperability testing of combinations of different types of resources in a storage area network environment. In one embodiment, interoperability lab 188 provides the compatibility information 196 for storage in repository 177. The compatibility information 196 can include records of information indicating which specific types of storage area network resources work properly together and therefore can be used in a respective storage area network 102.

In addition to maintaining the compatibility information 196, the storage area network advisory system 100 maintains (a repository of) message rules 118 for selectively applying and providing advisory messages (e.g., messages 135) associated with different proposed (e.g., not yet implemented or currently implemented) storage area network configurations. Each of the one or more of the message rules 118 can specify a format for displaying different types of advisories such as whether a respective storage area network resource in a proposed storage area network configuration maps to multiple different possible types of qualified resources.

The storage area network advisory system 100 herein can receive either raw or refined configuration information 194 associated with a combination of storage area network resources. For example, in one embodiment, collection function 105 collects raw information (e.g., character string information) by communicating with each of multiple storage area network resources in a respective storage area network 102. In other embodiments, an administrator generates the configuration information 194. The storage area network configuration information can include a proposed combination of resources such as those based on new storage area network designs, modeling of changes to existing storage area network designs, proposal of changes to fix a storage area network, etc.

Regardless of whether configuration information 194 is raw data collected from resources in a storage area network 102 or provided by an administrator (e.g., user 108), the mapping function 120 of storage area network advisory system 100 maps (or attempts to map using best efforts) each of the storage area network resources in a proposed combination to one or more possible non-ambiguous identities. That is, in certain cases, mapping function 120 is able directly map each in a proposed combination of resources to a corresponding single one of multiple qualified resource types.

Occasionally, the mapping function 120 of storage area network advisory system 100 will be unable to precisely map one or more given resources to corresponding known identities. Accordingly, these resources can be (provisionally) mapped to multiple different resource types if it is known that the resource is a resource in a group of resources. This latter case (e.g., mapping of a resource to multiple different types) occurs when mapping function 120 associated with the storage area network advisory system 100 is uncertain of a resource type to assign to a resource present in a proposed storage area network configuration.

In the present example, column 132-1 of mapped information 129 specifies resource names associated with each resource in a proposed set of resources (e.g., as specified by configuration information 194) to be tested for compatibility. Column 132-2 of mapped information 129 specifies the corresponding identities to which each of the resources specifically maps. In one embodiment, the configuration information 194 includes a string of character information retrieved from a respective storage area network resource in storage area network 102. Because there are no standards for providing resource information from a given resource in storage area network 102, each resource can provide different types of information in a respective one or more character strings— some of which aids in mapping, some of which does not aid in mapping of resources to corresponding identities.

Based on the received character string information of information provided by user 108 (e.g., configuration information 194), mapping function 120 attempts to match the unknown resources to corresponding known types of resources. After mapping by mapping function 120, rule engine 145 performs a comparison test to identify whether the configuration of resources are compatible for use in storage area network 102.

Now, referring to the example in FIG. 1, mapped information 129 illustrates both unambiguously mapped and ambiguously mapped types of resources for a given proposed combination of storage area network resources. In the present example, the configuration information 194 specifies four different storage area network resources such as a host computer system, an operating system, a host bus adapter, and a storage array. The host computer system, host bus adapter, and storage array each (unambiguously) map directly to a known type of storage area network resource. Operating system ambiguously maps to multiple different possible resources.

As previously discussed, mapping function 120 attempts to match each of the resources (e.g., corresponding data string information received from the respective resource in storage area network 102) to a known corresponding identity. For example, mapping function 120 successfully maps (with a high degree of confidence) the host computer system to identity A, host bus adapter to identity B, and (storage) array to identity C. Note that the mapping function is unable to precisely map the received information associated with the operating system directly to a single resource type. However, the mapping function 120 is able to narrow down the possible identities associated with the operating system to identities such as D, E, or F.

In a circumstance in which each resource in the storage area network configuration unambiguously maps to a corresponding known and tested resource type, the storage area network advisory system 100 can access the compatibility information 196 in the above-mentioned repository 177 and verify whether the proposed storage area network configuration will work properly or not. In one embodiment, the rule engine 145 checks whether the repository 177 (e.g., a database) includes a record (e.g., compatibility information) specifying that a corresponding combination of resources is valid. Based on the comparison, if a combination of resource types in the proposed storage area network configuration is incompatible (e.g., a record in not found in the database specifying the proposed combination), the proposed storage area network configuration will not work properly. Conversely, if a combination of resource types in the proposed storage area network configuration is compatible based on the comparison, the proposed storage area network configuration theoretically should work properly.

In one embodiment, in response to identifying that a given one or more resources in a proposed storage area network configuration maps to multiple different possible types of resources (e.g., that operating system maps to identities D, E, or F), the storage area network advisory system 100 initiates validation of the combination of storage area network resources with respect to known acceptable configurations even though the operating system maps to multiple different possible types of resources. For example, in the context of one embodiment, the storage area network advisory system 100 compares each of different possible permutations associated with a proposed storage area network configuration (e.g., as specified by configuration information 194) with the acceptable configurations specified by the compatibility information 196 stored in the repository 177. In general, the comparison produces an output of whether the configuration under test is acceptable.

The storage area network advisory system 100 includes rule engine 145 that applies one or more corresponding message rendering rules 118 for providing notification (e.g., to a storage area network administrator) whether a proposed combination of storage area network resources includes any ambiguously mapped (e.g., multi-mapped) storage area network resources. The notification can be included in a report (e.g., messages 135) indicating which of the multiple different possible types of resources that an "unmapped" or "multi-mapped" resource must be in order for the combination of resources to form an acceptable configuration for use in a storage area network 102. For example, assume as discussed above that the host computer maps to a known resource of type A, the operating system maps to multiple possible resource types such as types D, E, or F, the host bus adapter maps to resource type B, and the storage array maps to resource type C. Given the uncertainty associated with the operating system type, there are multiple possible permutations for validation by rule engine 145. For example, the storage area network configuration (e.g., combination of proposed resources) as specified by configuration information 194 could be:

(host=A, operating system=D, host bus adapter=B, storage array=C)
(host=A, operating system=E, host bus adapter=B, storage array=C)
(host=A, operating system=F, host bus adapter=B, storage array=C)

Assume that the operating system maps only to one known type of resource such as resource type D, E, or F. However, even though it is uncertain to which of the multiple different resource types the operating system maps, the storage area network advisory system 100 checks each of the permutations and whether any or all of the different permutations associated with the proposed resource combination are acceptable or compatible for use in a storage area network 102.

In general, there are three possible outcomes as a result of a comparison of mapped information 129 to compatibility information 196: all permutations are acceptable, some of the permutations are acceptable, or none of the permutations are acceptable for use in storage area network 102. The storage area network advisory system 100 can provide notification of any of these outcomes based on application of the different message rules 118.

If all or none of the permutations are acceptable storage area network configurations, the user 108 (e.g., network administrator) need not delve more deeply into a process of determining which of the three types of resources the operating system actually maps since, in either of these cases, the proposed storage area network configuration is definitively either acceptable or not acceptable even though there happens to be ambiguity with respect to the actual type associated with the operating system. Via messages 135, the storage area network advisory system 100 provides notification of whether the configuration is acceptable.

When only some (e.g., one or more) of the possible permutations (e.g., ADBC, AEBC, or AFBC) are acceptable for use in storage area network 102 and some are not, the storage area network advisory system 100 provides a corresponding notification to a respective network administrator. Rule engine 145 initiates message rendering module 140 of the storage area network advisory system 100 to provide notification of which resource type the operating system must be in order for the proposed storage area network configuration to be valid.

Suppose in the present example that the storage area network advisory system 100 learns (via the comparison with the compatibility information 196) that only resource type D and E (operating system) can be used as a qualified combination with resource types A (host), B (host bus adapter), and C (storage array). In the context of this example, the rule engine 145 of storage area network advisory system generates and forwards message data 150 to message rendering module 140. Message rendering module 140 utilizes the message data 150 to populate messages 135 on display screen 130. Accordingly, storage area network advisory system 100 provides notification (e.g., a warning or error message to) the user 108 that a proposed combination (including the multi-mapped operating system component) is acceptable as long as the operating system is of the type D or E.

Note that a proposed combination of storage area network resources may include multiple instances of multi-mapped resources. For example, suppose that a resource such as the host bus adapter in mapped information 129 maps to multiple resources such as resource type B as well as resource type G. In such a case and in a similar vein as discussed above, the rule engine 145 of storage area network advisory system 100 can check the different permutations for a combination of the single mapped (e.g., the host computer system and storage array) and multiple-mapped resources (e.g., the operating system and the host bus adapter) and provide an indication of which permutations produce acceptable combinations for use in a storage area network environment. In other words, in the context of this latter example in which the host bus adapter multi-maps to resource type B or G, the rule engine 145 checks the different permutations including ADBC, AEBC, AFBC, as well as ADGC, AEGC, and AFGC and provides notification of whether any of these combinations are acceptable based on a comparison with respect to compatibility information 196.

In one embodiment, the user 108 can request that the storage area network advisory system 100 produce a listing (e.g., of rows and columns of information) of which combinations of resource types are acceptable. For example, upon displaying an error/warning message to the user 108 via messages 135 as discussed above, the message rendering module 140 can embed a selectable region in a displayed message (e.g., one of messages 135) enabling the user to view a table of different acceptable permutations.

Suppose again that only the permutations of resources including ADBC and AEBC recite a compatible grouping of resources for use in storage area network 102. In response to selection by user 108 such as clicking on the above-mentioned selectable region, the message rendering module 140 of storage area network advisory system 100 prompts displays a table including the acceptable configuration such as:

| HOST | OPERATING SYSTEM | HOST BUS ADAPTER | STORAGE ARRAY |
|------|------------------|------------------|---------------|
| A | D | B | C |
| A | E | B | C |

Accordingly, embodiments herein include providing one or more advisories indicating which, if any, permutations of a resource combination are valid for use in a storage area network 102. Additionally, embodiments herein include a rule engine 145 that i) identifies whether a given (multi-mapped) storage area network resource such as host bus adapter in a proposed combination of storage area network resources is potentially one of resource types D, E, or F, and ii) verifies whether permutations associated with the combination including the given (multi-mapped) storage area network resource (e.g., the operating system in the above example) and the single-mapped resources (e.g., the most computer system, host bus adapter, and the storage array) in the combination are compatible for use in a respective storage area network environment. In one embodiment, the verification step can includes: i) validating whether a first possible configuration (e.g., ADBC) represents an acceptable configuration of interoperable storage area network resources; ii) validating whether a second possible configuration (e.g., AEBC) represents an acceptable configuration of interoperable storage area network resources; and iii) validating whether a third possible configuration (e.g., AFBC) represents an acceptable configuration of interoperable storage area network resources.

Figure 2:
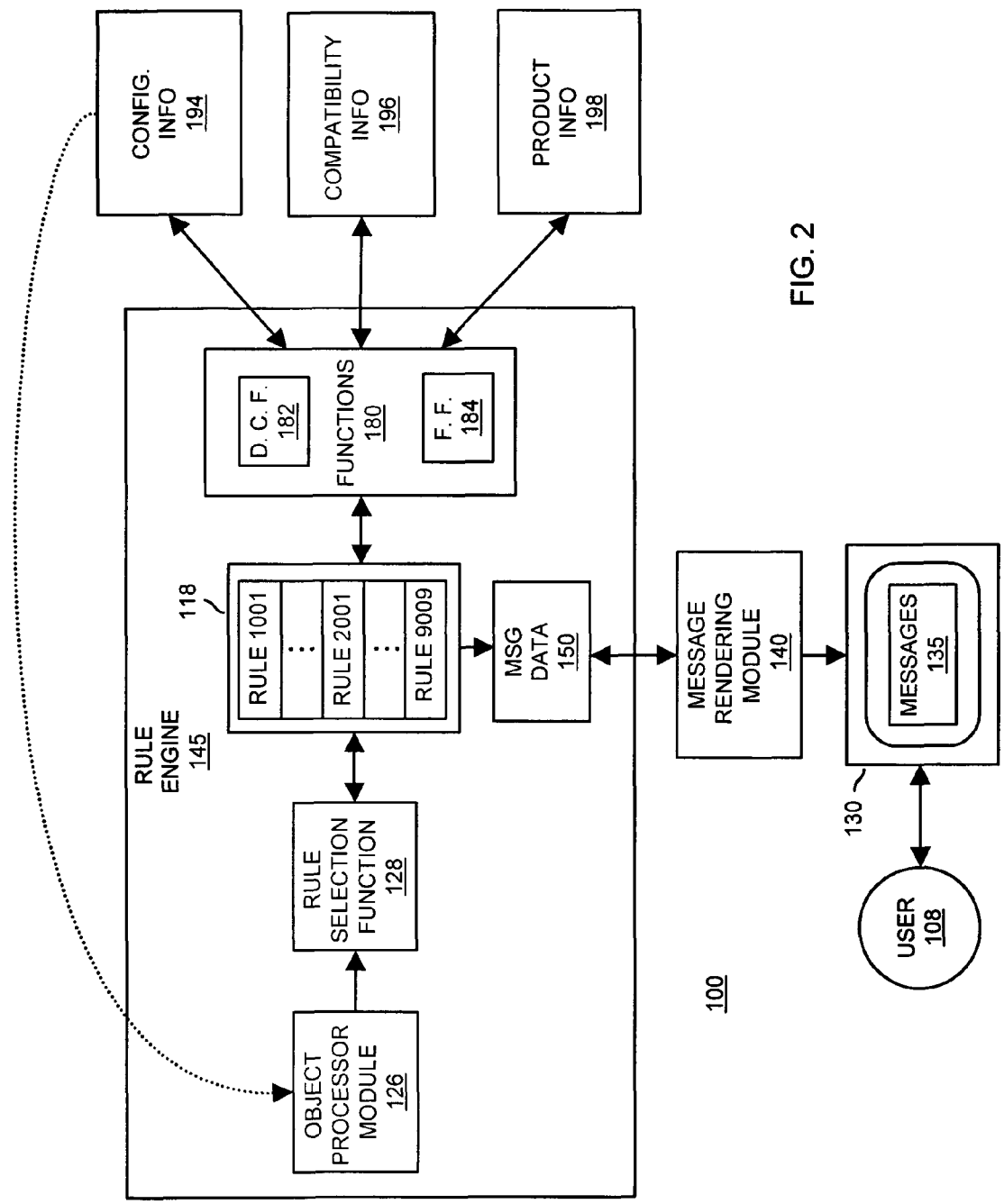
FIG. 2 is an example diagram illustrating a storage area network advisory system according to embodiments herein.

FIG. 2 is an example diagram of storage area network advisory system 100 including a rule engine 145 for applying rule logic 118 (e.g., software code to carry out application of rules) according to embodiments herein. As shown, storage area network advisory system 100 includes rule engine 145, message rendering module 140, display screen 130, user 108, configuration information 194 (e.g., storage area network configuration information), compatibility information 196, and product information 198. Rule engine 145 includes an object processor module 126, rule selection function 128, rule logic 118, message data 150, and functions 180. Functions 180 include data filter functions 182 and data collection functions 184. Display screen 130 selectively displays messages 135 for viewing by user 108.

In general, rule engine 145 validates a configuration associated with a system such as a respective storage area network 102 as discussed above for FIG. 1. Upon detecting a configuration error or that a respective storage area network configuration is sub-optimal based on application of rule logic 118, rule engine 145 generates message data 150. Message rendering module 140 utilizes the message data 150 (generated by rule logic 118) for purposes of generating messages 135 on display screen 130 for a respective user 108. Accordingly, a respective user 108 can be notified of whether a configuration has fatal errors or merely whether a respective storage area network configuration is sub-optimal.

In the context of one embodiment, the rule engine 145 initially receives an indication (from user 108 or other entity) of corresponding configuration information 194 associated with the respective storage area network to be validated or checked. The configuration information 194 can include or specify multiple managed objects (e.g., managed resources), each of which includes specific information indicating configuration information associated with a respective resource in the storage area network. Resources (to be validated, verified, checked, tested, . . . ) can include elements in the storage area network such as host resources, switch resources, storage resources, etc. as more particularly shown and discussed in FIG. 11.

Referring again to FIG. 1, to validate a respective resource combination for use in storage area network 102, the object processor module 126 of rule engine 145 retrieves each of multiple objects from configuration information 194 and applies rule logic 118 (e.g., instructions to carry out each of multiple different rules) to determine whether an existing or newly proposed storage area network has been configured properly. A combination of the managed objects represents the configuration of the storage area network. Application of rule logic 118 produces different output data (e.g., message data 150) depending on which one or more applied rules happens to fail.

In one embodiment, the object processor module 126 retrieves information from the configuration information 194 at least in part based on an object-by-object (e.g., resource-by-resource) basis. That is, the rule engine 145 can sequentially validate (e.g., based on a predetermined order) different groupings of resources as specified by configuration information one at a time. Application of a series of storage area network configuration tests according to rules 118 ensures that a respective storage area network has been thoroughly verified for use in storage area network environment 102.

In the context of the present example, assume that rule engine 145 initially utilizes object processor module 126 to identify type or attribute information associated with a given resource of multiple resources in a storage area network. After identifying a type and/or attributes associated with a given resource as specified by the configuration information 194, the rule engine 145 executes rule selection function 128 to identify which of one or more rules to apply to the combination (of resources) under test. An example of pseudo code for identifying which rules to apply to a given one or more resources under test can be found in Appendix A of this disclosure.

In one embodiment, the rule selection function 128 (or functions as the case may be) can specify additional information such as which of multiple rules to apply to the identified type of resource, an order for applying the rules, conditions under which certain rules will be applied to the given resource, and so on.

To carry out a respective rule, the rule logic 118 executes functions 180 such as data filter functions 182 and data collection functions 184. Based on execution or calls to functions 180, the rule logic 118 is able to retrieve further information that is used for purposes of testing the resource grouping under test. In certain cases, the rule logic 118 retrieves additional portions (e.g., other object information in a respective SAN file associated with the resources under test) of configuration information 194 to determine how the resources under test and/or other related resources are configured for purposes of carry out one or more rules as specified by the selected function.

In addition to potentially retrieving related configuration information 194 associated with the combination under test for testing purposes, the rule logic 118 can initiate execution of functions 180 to retrieve further information such as compatibility information 196 and product information 198 associated with the resource under test. For example, rules in the rule logic 118 can utilize the data collection function 182 and the filter function 184 to enable rule logic 118 to access compatibility information 196 and thus identify whether a resource grouping or resource under test is compatible with other resources present in the storage area network environment 102. In other words, application of a respective rule may require more particular or additional knowledge of the resource under test that is not included in object information initially retrieved from the configuration information 194. The functions 180 as discussed above enable retrieval of additional information associated with a managed object for purposes of testing the managed object.

As an example of rule engine 145 operation, assume that configuration information 194 enables a corresponding mapping function 120 to identify a specific make, model, and version of each resource in a combination under test. Retrieved compatibility information 196 can indicate which types of switches work with which types of hosts and storage arrays in the storage area network.

As previously discussed, message rendering module 140 utilizes message data 150 to generate messages 135 for viewing by a respective user 108. Consequently, following application of rule logic 118 to validate a respective storage area network configuration, a respective user can be notified of events (e.g., via use of the error and/or warning information) such as whether a respective storage area network configuration is operable, which resources in a storage area network are incompatible, whether a respective storage area network configuration is configured for efficient operation, etc.

FIGS. 3 and 4 are example diagrams of message rules 118 according to embodiments herein. Each of the rules includes an identifier value (e.g., a rule number) and specifies (e.g., via a filter value) a type of one or more resources to which the rule pertains. Additionally, each rule can specify details associated with a respective test to be applied to a respective resource under test as well as types of message data output parameters to generate in the event that a respective resource grouping under test fails a particular rule.

More specifically, FIG. 3 specifies details associated with rule 118-1. As shown, rule 118-1 has a corresponding identifier value=5701 and is used to test base connectivity interoperability when one specified component in a proposed grouping of resources (e.g., a group including a host computer system, an operating system, a host bus adapter, and a storage array) is an ambiguously mapped (e.g., multi-mapped to a number of different possible resources) resource. As indicated, application of rule 118-1 reports back a specific type that an unknown resource must be in order for a respective combination of resources to be interoperable. Display of a corresponding messages associated with rule 118-1 can include a single message text format or combined message text format. The single message text format can be used to display a message when only a single grouping of proposed resources under test is multiple-mapped. The combined message text format can be used to display a listing of multiple messages of the same type for display to the user 108. In either case, the message rule 118-1 can initiate display of different acceptable configurations as illustrated in FIG. 5.

FIG. 4 specifies details associated with message rule 118-2, which is similar to message rule 118-1 as discussed above in FIG. 3. However, rule engine 145 applies message rule 118-2 in FIG. 4 when there are two ambiguously mapped resources in a proposed storage area network configuration.

As shown, rule 118-2 has a corresponding identifier value=5702 and is used to test base connectivity interoperability when two specified components in a proposed grouping of resources (e.g., a group including a host computer system, an operating system, a host bus adapter, and a storage array) are ambiguously mapped (e.g., multi-mapped to a number of different possible resources) resources. As indicated, application of rule 118-2 reports back a specific type that the unknown resources must be in order for a respective combination of resources to be interoperable.

Display of a corresponding message (e.g., one or more of messages 135) associated with rule 118-2 can include a single message text format or combined message text format. The single message text format can be used to display a warning message when there is only one proposed configuration of resources that is partially invalid. The combined message text format can be used to display a listing of multiple messages of the same type for display to the user 108. In either case, the message rule 118-1 can initiate display of a selectable region in a display message to enable further viewing of different acceptable configurations as illustrated in FIG. 5. In other words, the user 108 can select to view the different acceptable permutations of resources as shown in the example of FIG. 5.

FIG. 5 is a diagram illustrating an example of display message 135-1 according to embodiments herein. As shown, display message 135-1 indicates different qualified combinations of resources for use in a storage area network environment. Note that in the present example, for each of the six different possible listed configurations, the host computer system type=Dell Power Edge 2450™, operating system=Microsoft Windows 2000 SP4™, storage array=EMC Symmetrix 8000 Series™. Because of ambiguous mapping (e.g., multi-mapping) associated with the host bus adapter, display message 135-1 indicates the different possible types of the host bus adapter that can be used in connection with the above resources. For example, the first qualified configuration includes a host bus adapter=Emulex LP7000E™, the second listed qualified configuration includes a host bus adapter=Emulex LP9002DC-E™, and so on. Accordingly, the user 108 can be immediately notified of which permutations of resources are valid for use in storage area network 102.

FIG. 6 is a diagram of message rule 118-3 according to embodiments herein. As shown, rule 118-3 has a corresponding identifier value=5000 and is used to test whether a component is qualified (e.g., pre-tested) for use in a corresponding storage area network environment. If the component under test is not found in a so-called ESM database listing qualified components, message rule 118-3 specifies a message to display the corresponding error to a respective user 108.

FIG. 7 is a block diagram illustrating an example computer system 610 (e.g., a storage area network management control center) for executing a rule engine 145 and/or other related processes according to embodiments herein. Computer system 610 can be a computerized device such as a personal computer, workstation, portable computing device, console, network terminal, processing device, etc.

As shown, computer system 610 of the present example includes an interconnect 311 that couples a memory system 115, a processor 110, an I/O interface 314, and a communications interface 315. Peripheral devices 316 (e.g., one or more optional user controlled devices such as a keyboard, mouse, display screens, etc.) couple to processor 110 through I/O interface 314. I/O interface 314 enables computer system 610 to selectively access information in repository 177 (such as configuration information 194, compatibility information 196, and product information 198), apply message rules 118, and produce message data 150 for potentially displaying messages 135 on display screen 130. Communications interface 315 enables computer system 310 to communicate over network 390 to transmit and receive information from different resources if necessary.

In one embodiment, computer system 610 can initiate the display of configuration information, messages 135, etc. on corresponding display screens for viewing by one or more respective network administrators (e.g., user 108) that manage (e.g., validate) and configurations associated with storage area network environment 102.

As shown, memory system 115 is encoded with rule engine application 145-1 that supports storage area network resource validation according to embodiments herein. Rule engine application 145-1 can be embodied as software code such as data and/or logic instructions (e.g., code stored in memory 115 or on another computer readable medium such as a disk) that, when executed, support functionality according to different embodiments described herein.

During operation, processor 110 accesses memory system 115 via the interconnect 311 in order to launch, run, execute, interpret or otherwise perform the logic instructions associated with rule engine application 145-1. Execution of rule engine application 145-1 produces processing functionality in rule engine process 145-2 to carry out embodiments as described herein. In other words, the rule engine process 145-2 represents one or more portions of the rule engine application 145-1 (or the entire application) performing within or upon the processor 110 in the computer system 610.

It should be noted that the rule engine 145 (as in FIG. 1) can be represented by either one or both of the rule engine application 145-1 and/or the rule engine process 145-2. For purposes of this discussion and different embodiments herein, general reference will again be made to the rule engine 145 as performing or supporting the various steps and functional operations as previously discussed and as will be discussed further in this specification.

It should be noted that, in addition to the rule engine 145, embodiments herein include the rule engine application 145-1 itself (i.e., the un-executed or non-performing logic instructions and/or data). The rule engine application 145-1 can be stored on a computer readable medium such as a floppy disk, hard disk, or optical medium. The rule engine application 145-1 can also be stored in a memory type system such as in firmware, read only memory (ROM), or, as in this example, as executable code within the memory system 115 (e.g., within Random Access Memory or RAM). In addition to these embodiments, it should also be noted that other embodiments herein include the execution of rule engine application 145-1 in processor 110 as the rule engine process 140-2. Thus, those skilled in the art will understand that the computer system 610 may include other processes and/or software and hardware components, such as an operating system that controls allocation and use of hardware resources.

Functionality supported by computer system 610 such as a management control center including rule engine 145 will now be discussed with respect to flowcharts in FIGS. 8-10. For purposes of this discussion, computer system 610 and, more particularly, message rule engine 145 (e.g., rule engine application 145-1 or rule engine process 145-2) can perform steps in the flowcharts at run-time. This functionality can be extended to the other entities as well. Note that the steps in the below flowcharts need not always be executed in the order shown.

Figure 8:
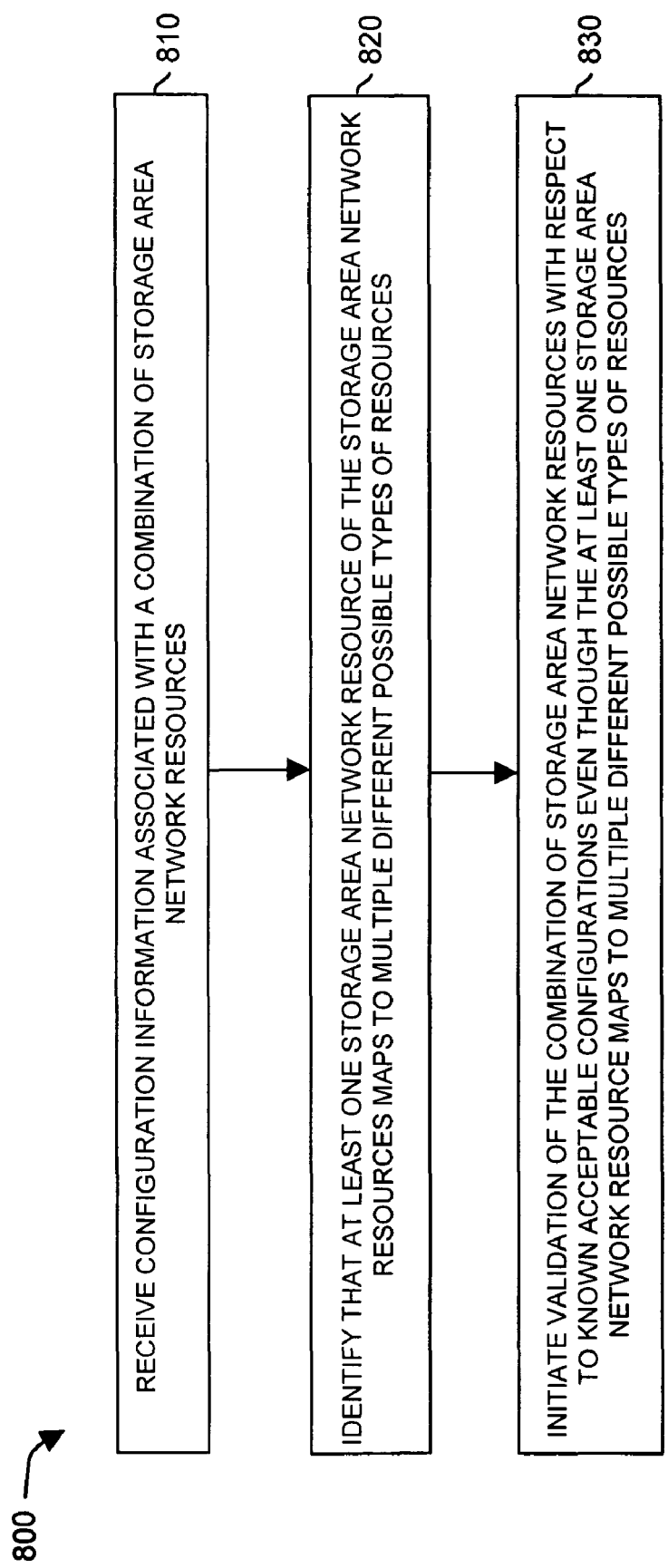
FIGS. 8 and 9 combine to form a more detailed example flowchart illustrating techniques associated with a rule engine according to embodiments herein.

Now, more particularly, FIG. 8 is a flowchart 800 illustrating a technique associated with storage area network advisory system 100 according to an embodiment herein. Note that techniques discussed in flowchart 800 overlap and summarize the embodiments as discussed above.

In step 810, the storage area network advisory system 100 receives configuration information 194 associated with a combination of storage area network resources.

In step 820, the storage area network advisory system 100 identifies that one or more storage area network resource in a proposed storage area network configuration maps to multiple different possible types of resources.

In step 830, the storage area network advisory system 100 initiates validation of the combination of storage area network resources with respect to known acceptable configurations (e.g., as specified by compatibility information 196) even though the at least one storage area network resource maps to multiple different possible types of resources.

Figure 9:
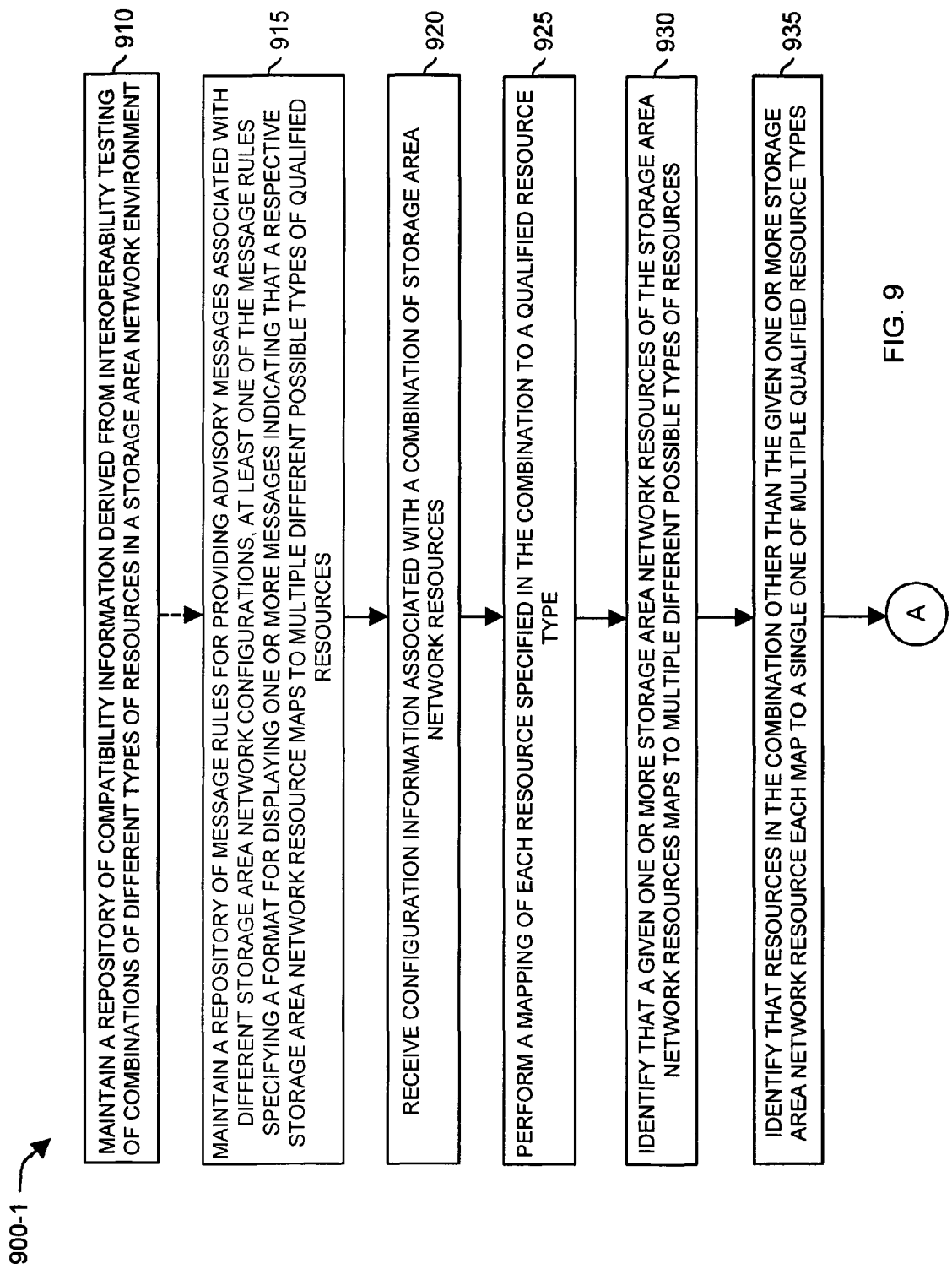
Figure 10:
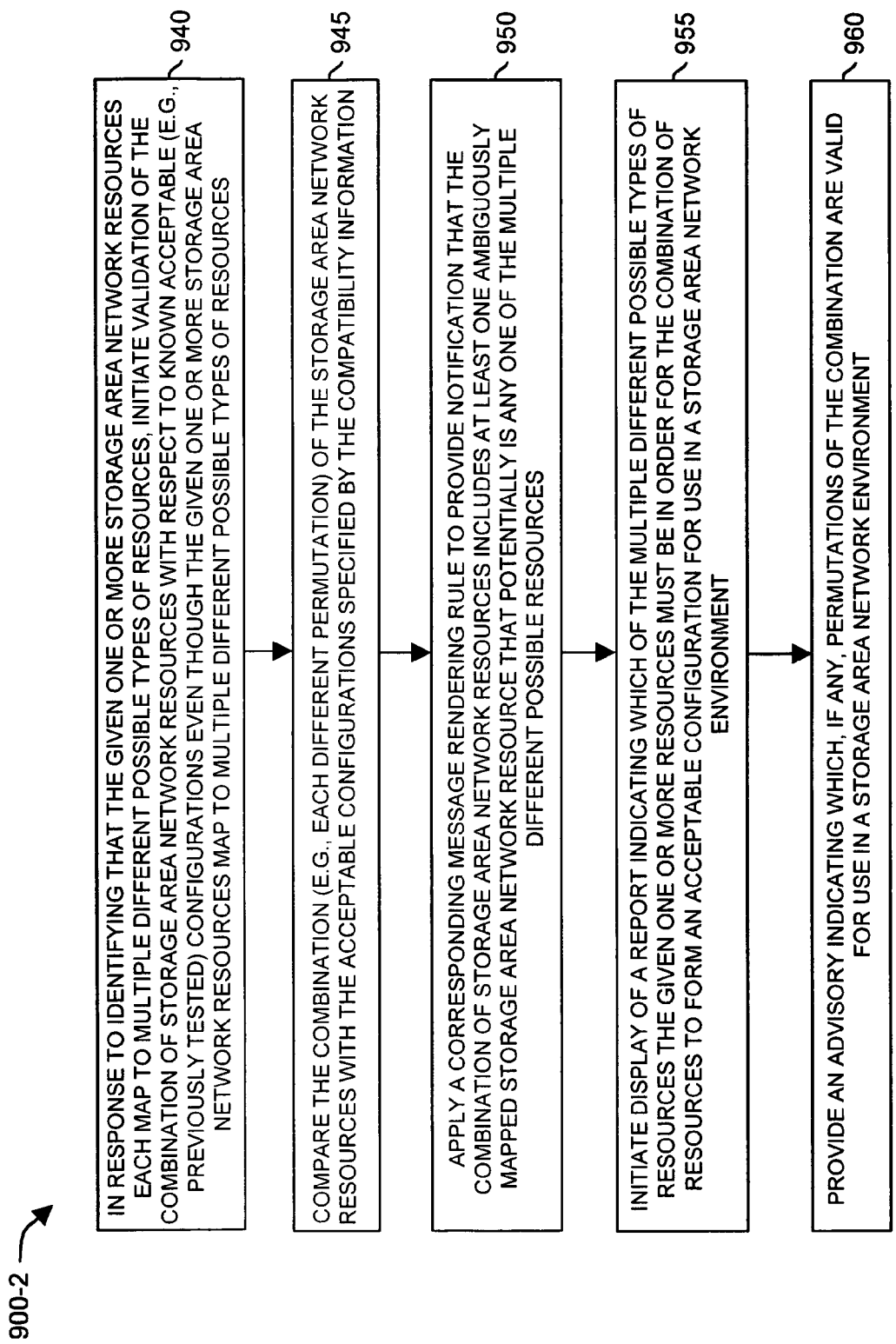
FIG. 10 is an example block diagram illustrating resources in a storage area network environment represented by managed objects according to an embodiment herein.

FIGS. 9 and 10 combine to form a flowchart 900 (e.g., flowchart 900-1 and flowchart 900-2) illustrating processing steps associated with storage area network advisory system 100 and/or rule engine process 145 according to embodiments herein. Note that techniques discussed in flowchart 900 overlap with the techniques discussed above in the previous figures.

In step 910, the storage area network advisory system 100 maintains a repository of compatibility information 196 derived from interoperability testing of combinations of different types of resources in a storage area network environment.

In step 915, the storage area network advisory system 100 maintains a repository 177 of message rules 118 for providing advisory messages 135 associated with different storage area network configurations. At least one of the message rules 118 specifies a message format for displaying one or more messages 135 indicating that a respective storage area network resource maps to multiple different possible types of qualified resources.

In step 920, the storage area network advisory system 100 receives configuration information 194 associated with a proposed combination of storage area network resources.

In step 925, the storage area network advisory system 100 performs a mapping of each resource specified in the combination to a qualified resource type. For example, the configuration information 194 received by the storage area network advisory system 100 can include raw data that is mapped via mapping function 120 to mapped information 129.

In step 930, the storage area network advisory system 100 identifies that a given one or more storage area network resources in the proposed combination maps to multiple different possible types of resources.

In step 935, the storage area network advisory system 100 identifies that at least a portion of the resources in the proposed combination each map to a single one of multiple qualified resource types.

In step 940, in response to identifying that one or more storage area network resources in the proposed storage area network configuration each map to multiple different possible types of resources, the storage area network advisory system 100 initiates validation of the combination of storage area network resources with respect to known acceptable (e.g., previously tested) configurations even though one or more storage area network resources map to multiple different possible types of resources.

In step 945, the storage area network advisory system 100 compares the combination (e.g., each different permutation) of the storage area network resources with acceptable configurations specified by the compatibility information 196.

In step 950, the storage area network advisory system 100 applies a corresponding message rendering rule 118 to provide notification that the proposed combination of storage area network resources includes at least one ambiguously mapped storage area network resource that potentially is any one of the multiple different possible resources.

In step 955, the storage area network advisory system 100 initiates display of a report (e.g., messages 135) indicating which of the multiple different possible types of resources that the multi-mapped resource must be in order for the combination of resources to form an acceptable configuration for use in a storage area network environment.

In step 960, the storage area network advisory system 100 provides an advisory (e.g., messages 135 and table 135-1 in FIG. 5) indicating which, if any, permutations of the combination are valid for use in a storage area network environment.

As discussed above, the storage area network advisory system 100 can repeat all or a portion of the above steps for each of proposed combination of resources to notify a user 108 whether a proposed storage area network would be operable if implemented.

FIG. 11 is a block diagram more particularly illustrating an example of connectivity associated with different types of resources (e.g., host resources 301, switch resources 302, and storage resources 303) in a storage area network environment 300. As previously discussed, the different types of resources in a system such as storage area network environment 300 can be represented by managed objects and/or corresponding relationship information stored in repository 180 as SAN configuration information 194.

As previously discussed for FIG. 1, rule engine 145 can apply rule logic 118 to produce message data 150. Message rendering module 140-2 can detect a display context associated with matter on display screen 130 and conditionally create and display pertinent rule violation messages (e.g., messages 135) for viewing on display screen 130 for user 108. The message rendering module 140-2 populates the messages on display screen 130 depending on message data 150 generated by rule engine 145.

Now referring more particularly to individual resources as shown in FIG. 11, storage area network environment 300 includes host entity 304-1 (e.g., a server), host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 610, and repository 180. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2. Host entities 304 execute a corresponding operating systems such as Windows 2000 S.P.4 or other operating system resource.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

As previously discussed, one pupose of rule engine 145 is to validate a configuration associated with a system such as storage area network environment 300. The message rendering module initiates display of violations, warnings, and/or informational messages for viewing on display screen 130 by user 108. Each host entity 304 may be limited to accessing certain storage devices 365 in storage system resource 375-1 based at least in part on configuration settings of switch devices 344 of network 340.

In further embodiments, computer system 610 enables a storage area network administrator to communicate over network 350 and/or network 340 and remotely modify a configuration of the storage area network 300. For example, in one embodiment, a storage area network administrator (e.g., a user 108) at a respective management station such as computer system 610 can modify the configuration of storage area network 300 via respective software commands in response to error, warning information generated by rule engine 145. In addition to being able to remotely modify the configuration of storage area network 300 via input to computer system 610, note also that a network administrator can physically change storage area network resources by replacement of one storage area network resource with another. As previously discussed, the computer system 610 can execute a collection function to learn of the types of resources in storage area network 300 and perform validation of same.

As discussed above, techniques herein are well suited for use in applications such as application of rules associated with a respective storage area network environment. However, it should be noted that configurations herein are not limited to such use and thus configurations herein and deviations thereof are well suited for use in other environments that generate messages as well.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

APPENDIX A

Base Connectivity and HBA Driver/Firmware Validation
    Build a cart for each proposed configuration
    For each cart:
        Remove the driver and firmware from the cart and store them.
        If any one of the components in the cart is obsolete or not in ESM

```
    Fire "not in ESM" rule for each such component.
    Continue with next cart.
End If
If number of unknown comps in the cart is >=2 or num-
    ber of type-in comps >=3
    Fire rule 5400 for each type-in component. (A type-in
        component is a resource that is not mapped to any
        resources, a resource that maps to multiple possible
        resources, a resource that maps to a known resource
        but is not qualified for use)
    Continue with next cart.
End If
Remove all type-in components from the cart and
    remember their component types.
For each type in component
    Add all multiple identities to the cart, if matching
        service returned them.
    Get the compatible rows by running the query.
    If row count <=0
        Fire rule 5700// Base Connectivity Incompatibility
        Continue with next cart;
    Else if there are 0 type-in components
        Use Base Connectivity and HBA Driver/Firmware
            with 0 type-in components as indicated below.
    Else if there is 1 type-in component
        Use Base Connectivity and HBA Driver/Firmware
            with 1 type-in components as indicated below.
    Else // there are 2 type-in components
        Use Base Connectivity and HBA Driver/Firmware
            with 2 type-in components as indicated below.
End for each cart.
Base Connectivity and HBA Driver/Firmware with 0 Type-in
Components.
    driverNotInESM=false
    firmwareNotInESM=false
    If driver is required //determined from the rows returned
        If driver is type-in
            driverNotInESM=true
        Else
            If driver is not present in the returned rows
                Fire rule 5710// driver, firmware not compatible
                Return;
            End if
        End if
    End if
    If firmware is required //determined from the rows returned
        If firmware is type-in
            firmwareNotInESM=true
        Else
            If firmware is not present in the returned rows
                Fire rule 5710 // driver, firmware not compatible
                Return;
            End if
        End if
    End if
    If driverNotInESM
        Fire "Not in ESM" rule for driver.
    End If
    If firmwareNotInESM
        Fire "Not in ESM" rule for firmware
    End If
Base Connectivity and HBA Driver/Firmware with 1 Type-in
Components.
    // Example scenarios with OS, Driver, Firmware
    1) Win2K (−2), 1.1 (10), 2.1 (20)
    2) Win2K (−2), 1.0 (−2), 2.1 (20)
    3) Win2K (−2), 1.0 (−2), 2.0 (−2)
    If driver is not type-in
        Remove all rows where driver doesn't match and driver
            column value !=0
        If remaining rows count=0
            Fire rule 5710 (driver/firmware not compatible)
            Return.
        End If
    End If
    If firmware is not type-in
        Remove all rows where firmware doesn't match and
            firmware column value !=0
        If remaining rows count=0
            Fire rule 5710 (driver/firmware not compatible)
            Return.
        End If
    End If
    Put driver, firmware and type-in comp back into the cart.
    Save the cart and replacements.
    If both driver and firmware are not type-ins
        QualifiedComps=extract all comps of type "type-in
            component type" from remaining rows
        If type-in comp is mapped to multiple comps
            If multiple comps==QualifiedComps
                Return. // No Rule because all mapped components
                    are qualified.
            End If
        End if.
        Fire rule 5701
    Else
        showDriverCol=false;
        showFWCol=false;
        If driver is type-in and at least one row has driver column
            value !=0 showDriverCol=true;
        If firmware is type-in and at least one row has firmware
            column value !=0
            showFWCol=true;
        If showDriverCol and showFWCol
            Fire rule 5400 for the type-in comp, driver, and firm-
                ware
        Else if showDriverCol
            Fire rule 5702 for the type-in comp and the driver
        Else if showFWCol
            Fire rule 5702 for the type-in comp and the firmware
        Else
            Fire rule 5701 for the type-in comp.
    End If
Base Connectivity and HBA Driver/Firmware with 2 Type-in
Components.
    // Example scenarios.
    1) Win2K (−2), Emulex 9802 (−2), 1.1 (10), 2.1 (20)
    2) Win2K (−2), Emulex 9802 (−2), 1.0 (−2), 2.1 (20)
    3) Win2K (−2), Emulex 9802 (−2), 1.0 (−2), 2.0 (−2)
    If driver is not type-in
        Remove all rows where driver doesn't match and driver
            column value !=0
        If remaining rows count=0
            Fire rule 5710 (driver/firmware not compatible)
            Return.
        End If
    End If
    If firmware is not type-in
        Remove all rows where firmware doesn't match and
            firmware column value !=0
        If remaining rows count=0
            Fire rule 5710 (driver/firmware not compatible)
            Return.
        End If
```

```
End If
Put driver, firmware and type-in comp back into the cart.
Save the cart and replacements.
If both driver and firmware are not type-ins
    If both type-ins are mapped to multiple components &&
        all combinations are present in the remaining rows
        Return. // No Rule, since all combinations are quali-
            fied.
    Else
        Fire rule 5702
    End If
Else
    Fire rule 5702
End If
Other ESM Rules Validation Logic
Build cart for each configuration (add type-in components
    too)
For each cart
    If any one of the components/attributes in the cart is
        obsolete or not in ESM
        // Not in ESM is determined by calling matching
            service for type-in comps.
        // Obsolete is determined by calling ESMComps API
            (looking up components.xml)
        Fire "not in ESM" rule for each such component/
            attribute
        Continue with next cart.
    End If
    // Unknown means, component is type-in and comp is
        not flagged as "not in ESM"
    // and comp is not mapped to multiple
    If number of unknown comps in the cart is >=2 or num-
        ber of type-in comps >=3
        Fire rule 5400 for each type-in component.
        Continue with next cart.
    End If
    Remove all type-in components from the cart and
        remember their component types.
    For each type in component in the cart
        Add all multiple sids to the cart, if matching service
            returned multiple components.
    Get the compatible rows by running the query.
    If row count <=0
        Fire 5XX0 //
        Continue with next cart;
    Else if there are 0 type-in components
        //No rule
        Continue with next cart.
    Else if there is 1 type-in component
        ESM Rules with 1 type-in components.
    Else // there are 2 type-in components
        ESM Rules with 2 type-in components.
End for each cart.
ESM Rules with 1 Type-in Components.
    // Example scenarios with a type-in HBA
    4) Emulex LP9802 (-2)
    Put type-in comps back into the cart.
    Save cart and replacements
    QualifiedComps=extract all comps of type "type-in com-
        ponent type" from the returned rows
    If type-in comp is mapped to multiple comps
        If multiple comps==QualifiedComps
            Return. // No Rule because all mapped components
                are qualified.
        End If
    End if.
    Fire 5XX1
ESM Rules with 2 Type-in Components.
    // Example scenarios with OS and HBA type-in
    4) Win2K (-2), Emulex 9802 (-2)
    Put type-in comps back into the cart.
    Save cart and replacements
    If both type-in are mapped to multiple components && all
        combinations are present in the remaining rows
        Return. // No Rule, since all combinations are qualified.
    End If
    Fire 5XX2
ESM Rules Popup Logic
    // Rule message will contain a cart id and csst sid with in the
        link.
    Get the cart from state.
    Remove all type-in components from the cart and remem-
        ber their component types.
    For each type in component
        Add all multiple sids to the cart, if matching service
            returned multiple components.
    Get the compatibility grid for this cart.
    Remove all attributes columns except HBA Driver, HBA
        Firmware and Switch Firmware.
    Remove non type-in comps
    Remove driver/firmware if all of col values are not appli-
        cable.
    If there is only column left all this
        Print the message in a liner format
    else
        Print resulting grid in the tabular format in the popup.
    EndIf
```

We claim:

1. A method comprising:
receiving configuration information associated with a combination of storage area network resources;
identifying that a particular storage area network resource of the storage area network resources maps to multiple different possible types of resources; and
initiating, via at least one processor device in a computer system, validation of the combination of storage area network resources with respect to known acceptable configurations even though the particular storage area network resource maps to multiple different possible types of resources.

2. A method as in claim 1 further comprising:
in response to identifying that the particular storage area network resource maps to multiple different possible types of resources, applying a corresponding message rendering rule to provide notification that the combination of storage area network resources includes at least one ambiguously mapped storage area network resource that potentially is any one of the multiple different possible resources.

3. A method as in claim 1, wherein identifying that the particular storage area network resource maps to multiple different possible types of resources includes identifying that the particular storage area network resource in the combination of storage area network resources is potentially a first type of resource or a second type of resource.

4. A method as in claim 3 further comprising:
validating whether a first possible configuration in which the particular resource is of the first type and resources other than the particular storage area network resource in the combination represent an acceptable configuration of interoperable storage area network resources; and
validating whether a second possible configuration in which the particular storage area network resource is of the second type and resources other than the particular storage area network resource in the combination represent an acceptable configuration of interoperable storage area network resources.

5. A method as in claim 1 further comprising:
in addition to identifying that the particular storage area network resource maps to multiple different possible types of resources, identifying that resources in the combination other than the particular storage area network resource maps to a single one of multiple qualified resource types that have been tested for use in combination with various other types of resources in a storage area network environment.

6. A method as in claim 5, wherein initiating validation of the combination of storage area network resources results in verifying that the combination including the particular storage area network resource and the resources in the combination other than the particular storage area network resource are compatible for use in a respective storage area network environment.

7. A method as in claim 1 further comprising:
in response to identifying that the particular storage area network resource maps to multiple different possible types of resources, applying a corresponding message rendering rule to generate a report to a user indicating which of the multiple different possible types of resources the particular storage area network resource must be in order for the combination to be validated for use in a respective storage area network environment.

8. A method as in claim 7 further comprising:
initiating display of the report on a respective display screen for the user;
in addition to initiating display of the report, initiating display of a selectable resource on the display screen enabling the user to view qualified configurations of the combination of storage area network resources.

9. A method as in claim 1 further comprising:
initiating display of a report indicating which of the multiple different possible types of resources the particular storage area network resource must be in order for the combination of resources to form an acceptable configuration for use in a storage area network environment.

10. A method as in claim 1 further comprising:
in addition to identifying that the particular storage area network resource maps to multiple different possible types of resources, identifying that resources in the combination other than the particular storage area network resource each map to a single one of multiple qualified resource types that have been tested for use in a storage area network environment; and
initiating display of a table listing:
i) a first acceptable permutation of resources including resources other than the particular storage area network resource as well as a first one of the multiple different possible types of storage area network resources, and
ii) a second acceptable permutation of resources including resources other than the particular storage area network as well as a second one of the multiple different possible types of storage area network resources.

11. A method as in claim 1 further comprising:
maintaining a repository of message rules for providing advisory messages associated with different storage area network configurations, at least one of the message rules specifying a format for displaying a message indicating that the particular storage area network resource maps to multiple different possible types of qualified resources; and
in addition to displaying the message, providing an advisory indicating which permutations of the combination are valid for use in a storage area network environment.

12. A method as in claim 1 further comprising:
via the at least one processor device:
mapping the first storage area network resource to a first resource type and a second resource type;
initiating display of a first permutation of resources, the first permutation specifying one resource type for each of the storage area network resources, the first permutation of resources including identification of the first resource type for the particular storage area network; and
initiating display of a second permutation of resources, the second permutation specifying one resource type for each of the storage area network resources, the second permutation of resources including identification of the second resource type for the particular storage area network.

13. A method as in claim 12 further comprising:
via the at least one processor device:
generating notification information, the notification information indicating compatibility of the first permutation of resources and compatibility of the second permutation of resources; and
providing notification that the particular storage area network resource maps to the first resource type and the second resource type and that it is unknown whether the particular resource is of the first resource type or the second resource type.

14. A method as in claim 1 further comprising:
via the at least one processor device:
identifying that resources in the combination other than the particular storage area network resource each map to a corresponding qualified resource type that has been tested for use in a storage area network environment;
mapping the first storage area network resource to a first resource type and a second resource type; and
initiating display of a first acceptable permutation of resources and a second acceptable permutation or resources:
i) the first acceptable permutation of resources including identification of at least one resource type of a resource in the combination other than a resource type of the particular storage area network resource and the first resource type for the particular storage area network resource; and
ii) the second acceptable permutation of resources including identification of the at least one resource type and the second resource type for the particular storage area network resource.

15. A computer program product including a non-transitory computer-readable medium having instructions stored thereon for processing data information, such that the instructions, when carried out by a processing device, enable the processing device to:
receive configuration information associated with a combination of storage area network resources;
identify that a particular storage area network resource of the storage area network resources maps to multiple different possible types of resources; and
initiate validation of the combination of storage area network resources with respect to known acceptable configurations even though the particular storage area network resource maps to multiple different possible types of resources.

16. A computer program product as in claim 15 having instructions enabling the processing device to:
in response to identifying that the particular storage area network resource maps to multiple different possible types of resources, apply a corresponding message rendering rule to provide notification that the combination of storage area network resources includes at least one ambiguously mapped storage area network resource that potentially is any one of the multiple different possible resources; and
wherein identifying that the particular storage area network resource maps to multiple different possible types of resources includes identifying that the particular storage area network resource in the combination of storage area network resources is potentially a first type of resource or a second type of resource, the computer program product including instructions further enabling the processing device to:
validate whether a first possible configuration in which the given resource is of the first type and resources other than the particular storage area network resource in the combination represents an acceptable configuration of interoperable storage area network resources; and
validate whether a second possible configuration in which the particular storage area network resource is of the second type and resources other than the particular-storage area network resource in the combination represents an acceptable configuration of interoperable storage area network resources.

17. A computer program product as in claim 15 having instructions enabling the processing device to:
in addition to identifying that the particular storage area network resource maps to multiple different possible types of resources, identify that resources in the combination other than the particular storage area network resource each map to a single one of multiple qualified resource types that have been tested for use in combination with various other types of resources in a storage area network environment.

18. A computer program product as in claim 15 having instructions enabling the processing device to:
in response to identifying that the particular storage area network resource maps to multiple different possible types of resources, apply a corresponding message rendering rule to generate a report to a user indicating which of the multiple different possible types of resources the particular storage area network resource must be in order for the combination to be validated for use in a respective storage area network environment;
initiate display of the report on a respective display screen for the user;
in addition to initiating display of the report, initiate display of a selectable resource on the display screen enabling the user to view qualified configurations of the combination of storage area network resources.

19. A computer program product as in claim 15 having instructions enabling the processing device to:
in addition to identifying that the particular storage area network resource maps to multiple different possible types of resources, identify that resources in the combination other than the particular storage area network resource maps to a single one of multiple qualified resource types that have been tested for use in a storage area network environment; and
initiate display of a table listing:
i) a first acceptable permutation of resources including resources other than the particular storage area network resource as well as a first one of the multiple different possible types of storage area network resources, and
ii) a second acceptable permutation of resources including resources other than the particular storage area network as well as a second one of the multiple different possible types of storage area network resources.

20. A computer system comprising:
a processor;
a memory unit that stores instructions associated with an application executed by the processor; and
an interconnect coupling the processor and the memory unit, enabling the computer system to execute the application and perform operations of:
receiving configuration information associated with a combination of storage area network resources;
identifying that the particular storage area network resource of the storage area network resources maps to multiple different possible types of resources; and
initiating validation of the combination of storage area network resources with respect to known acceptable configurations even though the particular storage area network resource maps to multiple different possible types of resources.

* * * * *